(12) United States Patent
Yao et al.

(10) Patent No.: US 8,040,640 B2
(45) Date of Patent: Oct. 18, 2011

(54) SLIDER AND MICRO-ACTUATOR ASSEMBLY, HEAD GIMBAL ASSEMBLY, AND DISK DRIVE UNIT WITH THE SAME

(75) Inventors: MingGao Yao, Dongguan (CN); YiRu Xie, Dongguan (CN); Lin Guo, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 330 days.

(21) Appl. No.: 12/385,628

(22) Filed: Apr. 14, 2009

(65) Prior Publication Data
US 2010/0259854 A1 Oct. 14, 2010

(51) Int. Cl.
*G11B 5/56* (2006.01)
(52) U.S. Cl. .................................... 360/294.4
(58) Field of Classification Search ................ 360/294.4
See application file for complete search history.

(56) References Cited

U.S. PATENT DOCUMENTS

| | | | | |
|---|---|---|---|---|
| 6,487,045 B1 * | 11/2002 | Yanagisawa | ................ | 360/236.5 |
| 6,697,232 B1 * | 2/2004 | Hipwell, Jr. et al. | ........ | 360/294.5 |
| 6,928,722 B2 * | 8/2005 | Yanagisawa | ................ | 29/603.07 |
| 7,298,593 B2 * | 11/2007 | Yao et al. | ................... | 360/294.4 |
| 7,312,956 B2 * | 12/2007 | Yao et al. | ................... | 360/294.4 |
| 7,379,274 B2 * | 5/2008 | Yao et al. | ................... | 360/294.4 |
| 7,474,512 B2 * | 1/2009 | Yao et al. | ................... | 360/294.4 |
| 2007/0076327 A1 * | 4/2007 | Yang et al. | ................. | 360/294.4 |

* cited by examiner

*Primary Examiner* — Huan Hoang
*Assistant Examiner* — Jay Radke
(74) *Attorney, Agent, or Firm* — Nixon & Vanderhye PC (57) ABSTRACT

A slider and micro-actuator assembly of the present invention comprises a substrate having a trailing edge and a leading edge opposite the trailing edge; a read/write transducer formed at the trailing edge of the substrate and a piezoelectric micro-actuator formed at the leading edge of the substrate. The piezoelectric micro-actuator connects with the leading edge of the substrate via two spaced insulation layers so as to form a space between the piezoelectric micro-actuator and the leading edge of the substrate, the substrate with the read/write transducer rotates against a center thereof when the piezoelectric micro-actuator is driven to generate a rotation torque to the substrate via the space. The structure of the slider and micro-actuator assembly prevents the read/write transducer from damaged and gets better operation performance when the piezoelectric micro-actuator is driven. The present invention also discloses a method for manufacturing a slider and micro-actuator assembly, a HGA with the slider and micro-actuator assembly and a disk drive unit having such HGA.

15 Claims, 11 Drawing Sheets

SLIDER AND MICRO-ACTUATOR ASSEMBLY, HEAD GIMBAL ASSEMBLY, AND DISK DRIVE UNIT WITH THE SAME

FIELD OF THE INVENTION

The present invention relates to an information recording disk drive device, and more specifically to a slider and micro-actuator assembly and a method for manufacturing the slider and micro-actuator assembly, head gimbal assembly (HGA) and disk drive unit with the same.

BACKGROUND OF THE INVENTION

Disk drives are information storage devices that use magnetic media to store data and a movable read/write transducer positioned over the magnetic media to selectively read data from and write data to the magnetic media.

Consumers are constantly desiring greater storage capacity for such disk drive devices, as well as faster and more accurate reading and writing operations. Thus, disk drive manufacturers have continued to develop higher capacity disk drives by, for example, increasing the recording and reproducing density of the information tracks on the disks by using a narrower track width and/or a narrower track pitch. However, each increase in track density requires that the disk drive device have a corresponding increase in the positional control of the read/write transducer in order to enable quick and accurate reading and writing operations using the higher density disks. As track density increases, it becomes more and more difficult to quickly and accurately position the read/write transducer over the desired information tracks on the disk. Thus, disk drive manufacturers are constantly seeking ways to improve the positional control of the read/write transducer in order to take advantage of the continual increases in track density.

Figure 1:
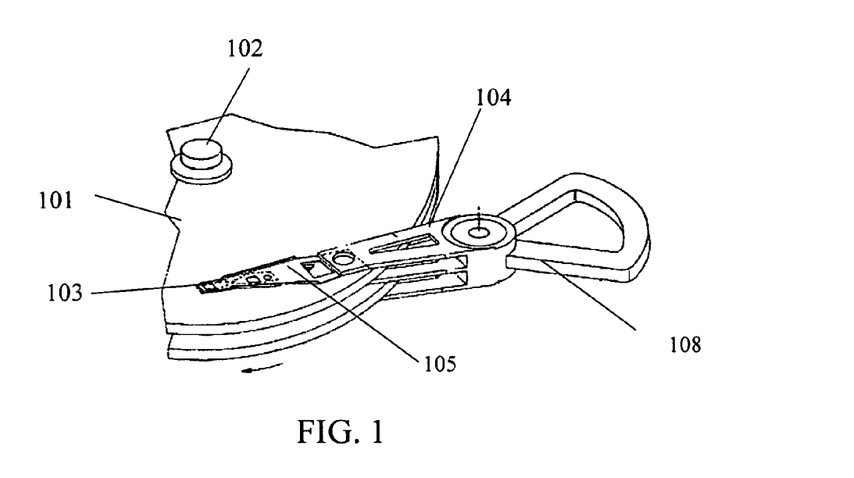
FIG. 1 is a perspective view of a conventional disk drive.

One approach that has been effectively used by disk drive manufacturers to improve the positional control of read/write transducers for higher density disks is to employ a slider and micro-actuator assembly. FIG. 1 provides an illustration of a typical disk drive unit with a slider and micro-actuator assembly. The disk drive device typically has a drive arm 104, a VCM (Voice Coil Motor) 108, a HGA 105 attached to and mounted on the drive arm 104, a stack of magnetic disks 101 suspending the HGA 105, and a spindle motor 102 for spinning the disks 101. The HGA 105 includes the slider and micro-actuator assembly 103 and a suspension 110 (referring to FIG. 2b) to support the slider and micro-actuator assembly 103.

Figure 2A:
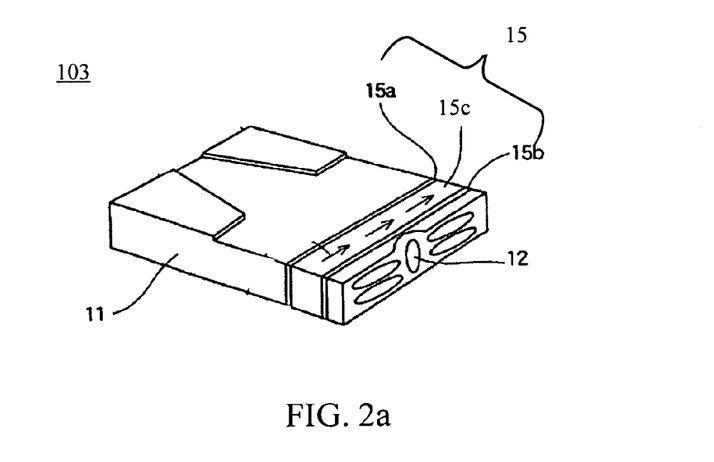
FIG. 2a is a perspective view of a slider and micro-actuator assembly of the disk drive shows in FIG. 1.

Referring to FIG. 2a, the slider and micro-actuator assembly 103 comprises a substrate 11 having a leading edge and a trailing edge opposite the leading edge, a piezoelectric (PZT) element 15 formed on the trailing edge of the substrate 11, and a read/write transducer 12 formed on the PZT element 15. In the above structure of the slider and micro-actuator assembly 103, the PZT element 15 is sandwiched between the substrate 11 and the read/write transducer 12. Specifically, the PZT element 15 comprises a first electrode layer 15a formed on the trailing edge of the substrate 11, a second electrode layer 15b formed on the read/write transducer 12, and a PZT layer 15c formed between the first electrode layer 15a and the second electrode layer 15b.

Figure 2B:
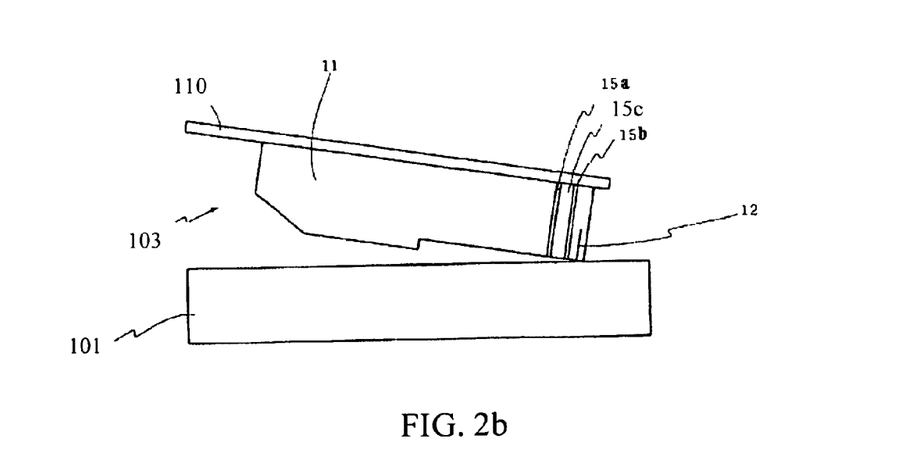
FIG. 2b is a side view of the slider and micro-actuator assembly shown in FIG. 2a with a disk when in operation.

Referring to FIG. 2b, when a voltage is applied to the first electrode layer 15a and the second electrode layer 15b, the PZT element 15 is driven and enables to deform, which accordingly adjusts the position of the read/write transducer 12 relative to the disk 101. However, as the PZT element 15 is located adjacent to the read/write transducer 12, the driving of the PZT element 15 will produce electrical charge and generate a potential voltage, which will make the read/write transducer 12 damaged in case that, for example, ESD (electrical static discharge damage) problem happens.

Hence, it is desired to provide an improved slider and micro-actuator assembly and manufacturing method thereof, a HGA, and a disk drive to solve the above-mentioned problems.

SUMMARY OF THE INVENTION

Accordingly, an object of the present invention is to provide a slider and micro-actuator assembly to avoid read/write transducer damaged and to get better operation performance.

Another object of the present invention is to provide a head gimble assembly with a slider and micro-actuator assembly, the head gimble assembly prevents the read/write transducer from damaged and gets better operation performance.

Another aspect of the present invention is to provide a disk drive unit, the disk drive unit prevents the read/write transducer from damaged and gets better operation performance.

Still another object of the present invention is to provide a method for manufacturing a slider and micro-actuator assembly which prevents the read/write transducer from damaged and gets better operation performance.

To achieve the above-mentioned object, a slider and micro-actuator assembly comprises a substrate having a trailing edge and a leading edge opposite the trailing edge; a read/write transducer formed at the trailing edge of the substrate; and a piezoelectric micro-actuator formed at the leading edge of the substrate. The piezoelectric micro-actuator connects with the leading edge of the substrate via two spaced insulation layers so as to form a space between the piezoelectric micro-actuator and the leading edge of the substrate, the substrate with the read/write transducer rotates against a center thereof when the piezoelectric micro-actuator is driven to generate a rotation torque to the substrate via the space.

Preferably, the substrate, the read/write transducer and the piezoelectric micro-actuator are integrally formed.

In an embodiment of the present invention, the two spaced insulation layers respectively connect two ends of the piezoelectric micro-actuator with the leading edge of the substrate.

Preferably, the piezoelectric micro-actuator comprises a first electrode layer formed at the leading edge of the substrate, a piezoelectric layer formed at the first electrode layer, and two second electrode layers respectively formed at the piezoelectric layer and spaced apart from each other.

A head gimbal assembly comprises a slider and micro-actuator assembly and a suspension to support the slider and micro-actuator assembly. The slider and micro-actuator assembly comprises a substrate having a trailing edge and a leading edge opposite the trailing edge; a read/write transducer formed at the trailing edge of the substrate; and a piezoelectric micro-actuator formed at the leading edge of the substrate. The piezoelectric micro-actuator connects with the leading edge of the substrate via two spaced insulation layers so as to form a space between the piezoelectric micro-actuator and the leading edge of the substrate, the substrate with the read/write transducer rotates against a center thereof when the piezoelectric micro-actuator is driven to generate a rotation torque to the substrate via the space.

Preferably, the suspension comprises a flexure with a tongue region for supporting the slider and micro-actuator assembly, and the tongue region has an outer tongue, an inner tongue formed within the outer tongue, and a pair of curved beams respectively connected the inner tongue at symmetrical positions with the outer tongue.

Also preferably, the slider and micro-actuator assembly is mechanically mounted on the inner tongue via an insulation layer.

Also preferably, the piezoelectric micro-actuator forms two pads thereon, and the outer tongue forms two piezoelectric connection pads thereon corresponding to the two pads of the piezoelectric micro-actuator, the two pads of the piezoelectric micro-actuator are respectively and electrically connected with the two piezoelectric connection pads of the outer tongue.

In an embodiment of the present invention, the flexure comprises a pair of outer triggers at opposite sides of the outer tongue, the pair of outer triggers respectively extend toward and connect with the outer tongue.

A disk drive unit comprises a head gimbal assembly; a drive arm to connect with the head gimbal assembly; a disk and a spindle motor to spin the disk. The head gimbal assembly comprises a slider and micro-actuator assembly and a suspension to support the slider and micro-actuator assembly. The slider and micro-actuator assembly comprises a substrate having a trailing edge and a leading edge opposite the trailing edge; a read/write transducer formed at the trailing edge of the substrate; and a piezoelectric micro-actuator formed at the leading edge of the substrate. The piezoelectric micro-actuator connects with the leading edge of the substrate via two spaced insulation layers so as to form a space between the piezoelectric micro-actuator and the leading edge of the substrate, the substrate with the read/write transducer rotates against a center thereof when the piezoelectric micro-actuator is driven to generate a rotation torque to the substrate via the space.

A method for manufacturing a slider and micro-actuator assembly comprises steps of: providing a wafer, the wafer having a trailing edge and a leading edge opposite the trailing edge and a plurality of read/write transducer formed within the trailing edge of the wafer; laminating an insulation layer on every two spaced lines of the leading edge of the wafer; forming a piezoelectric micro-actuator on the insulation layer; cutting the wafer into plurality of row bars, each row bar having a plurality of read/write heads in row; patterning each row bars to form air bearing surface for every transducer; and cutting each row bar into individual slider and micro-actuator assembly.

In an embodiment of the present in invention, the step of forming a piezoelectric micro-actuator on the insulation layer further comprises: forming a first electrode layer on the insulation layer; forming a piezoelectric layer on the first electrode layer; and forming two second electrode layers on the PZT layer surface, the two second electrode layers spaced apart from each other.

In comparison with the prior art, the piezoelectric micro-actuator is formed at the leading edge of the substrate while the read/write transducer is formed at the trailing edge of the substrate, thus when the piezoelectric micro-actuator is driven, no potential voltage will be produced on the read/write transducer and the ESD problem will not happen, which accordingly protects the read/write transducer from being damaged.

Other aspects, features, and advantages of this invention will become apparent from the following detailed description when taken in conjunction with the accompanying drawings, which are a part of this disclosure and which illustrate by way of example, principles of this invention.

BRIEF DESCRIPTION OF THE DRAWINGS

The accompanying drawings facilitate an understanding of the various embodiments of this invention. In such drawings:

FIG. 4a is a partially perspective view of the HGA shown in FIG. 3a;

FIG. 4b is a partially exploded view of the HGA shown in FIG. 3a;

FIG. 4c is a partially top view of the HGA shown in FIG. 3a;

FIG. 5b is a top view of the slider and micro-actuator assembly shown in FIG. 5a;

FIG. 6a shows one way of polarization directions and the input signal of the PZT micro-actuator of the slider and micro-actuator assembly shown in FIG. 5a;

FIG. 6b shows another way of polarization directions the input signal of the PZT micro-actuator of the slider and micro-actuator assembly shown in FIG. 5a;

FIG. 8a shows simulation data of displacement of the slider and micro-actuator assembly shown in FIG. 5a;

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a slider and micro-actuator assembly. The slider and micro-actuator assembly comprises a substrate having a trailing edge and a leading edge opposite the trailing edge; a read/write transducer formed at the trailing edge of the substrate and a piezoelectric micro-actuator formed at the leading edge of the substrate, the piezoelectric micro-actuator connects with the leading edge of the substrate via two spaced insulation layers so as to form a space between the piezoelectric micro-actuator and the leading edge of the substrate, the substrate with the read/write transducer rotates against a center thereof when the piezoelectric micro-actuator is driven to generate a rotation torque to the substrate via the space. The whole structure of the slider and micro-actuator assembly prevents potential voltage producing on the read/write transducer and accordingly enables to protect the read/write transducer from being damaged when the piezoelectric micro-actuator is driven.

Figure 3:
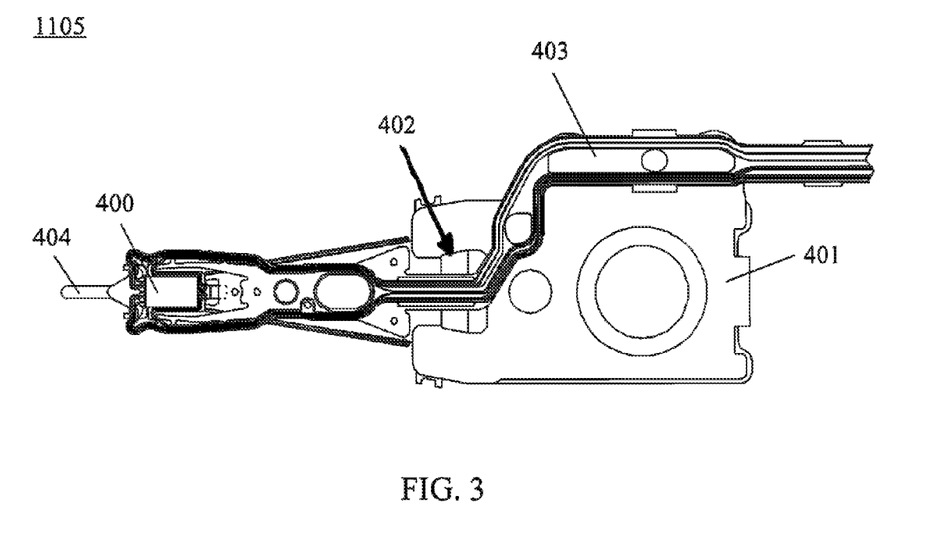
FIG. 3 is a top view of a HGA including a slider and micro-actuator assembly according to the present invention.

FIG. 3 illustrates an embodiment of a head gimbal assembly 1105 of the present invention. Referring to FIG. 3, the HGA 1105 generally comprises a slider and micro-actuator assembly 400 and a suspension to load or support the slider and micro-actuator assembly 400. The suspension includes a base plate 401, a hinge 402, a flexure 403 and a load beam 404, all of which are assembled together. The load beam 404 is connected to the base plate 401 by the hinge 402, and the flexure 403 runs from the hinge 402 to the load beam 404. One end of the load beam 404 is coupled to the base plate 401 which is swaged to the drive arm (not shown), and the other end of the load beam 404 supports a tongue region of the flexure 403. The tongue region of the flexure 403 provides flexibility for the slider and micro-actuator assembly 400. In order to smoothly and evenly transfer the load force from the load beam 404 to the slider and micro-actuator assembly 400, the load beam 404 provides a dimple 520 (shown in FIG. 7) to support the tongue region at a position where the slider and micro-actuator assembly 400 is mounted. The flexure 403 also forms a float region 455 at a top end thereof for facilitating electrical connection of a read/write transducer of the slider and micro-actuator assembly 400.

Figure 4A:
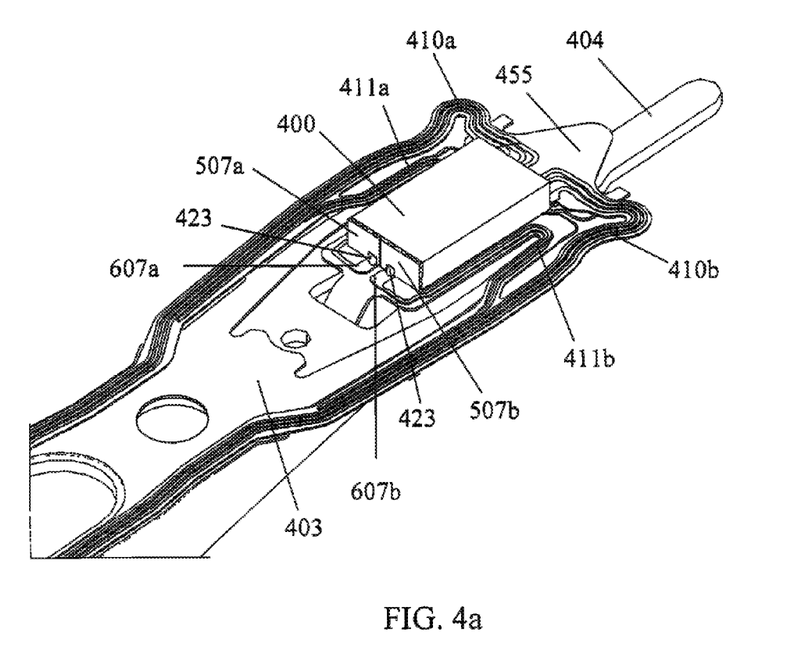
Figure 4B:
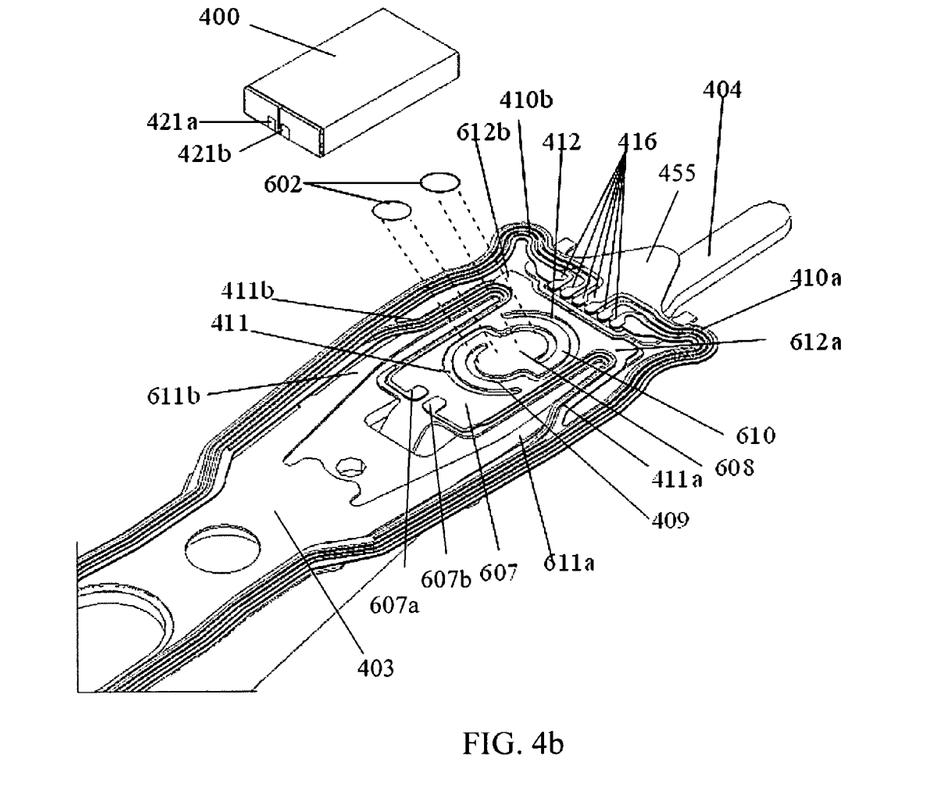
Figure 4C:
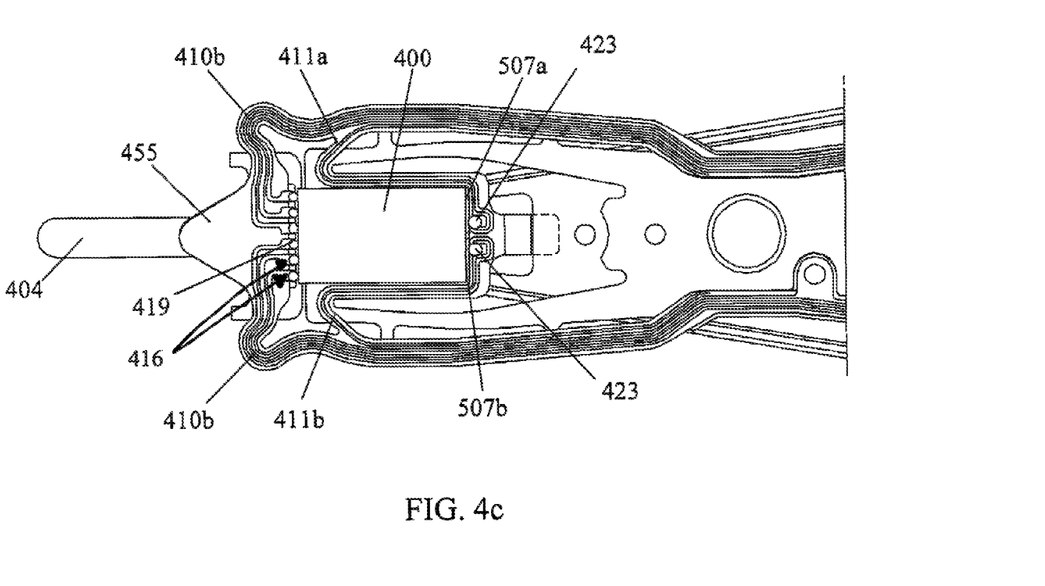

Referring to FIGS. 4a-4c, the tongue region supports the slider and micro-actuator assembly 400 and comprises an outer tongue 607, an inner tongue 608 formed within the outer tongue 607 and a pair of curved beams 409, 610 respectively connected the inner tongue 608 at symmetrical positions with the outer tongue 607. The pair of curved beams 409, 610 together with the outer tongue 607 and the inner tongue 608 forms a pairs of spaces 411,412, wherein one space 411 is formed between the outer tongue 607 and the curved beam 409 and between the curved beam 610 and the inner tongue 608, the other space 412 is formed between the outer tongue 607 and the curved beam 610 and between the curved beam 409 and the inner tongue 608. Based on the above structure, the flexure tongue forms a spring structure to support the slider and micro-actuator assembly 400, thus there is no force to transfer to flexure 403, which enables the head gimbal assembly better dynamic performance, lower gimbal stiffness and better servo bandwidth.

In addition, a pair of outer triggers 611a, 611b are formed at opposite sides of the outer tongue 607, and the pair of outer triggers 611a, 611b respectively extend toward and connect with the outer tongue 607 at two weak positions 612a, 612b. The introduction of the outer triggers 611a, 611b maintenances the tongue region of the flexure 403 to posses enough stiffness for supporting the slider-micro-actuator assembly 400.

Specifically referring to FIG. 4b, the outer tongue 607 forms two PZT connection pads 607a, 607b there on, and the float region 455 forms a plurality of head connection pads 416. The flexure 403 also has a set of inner traces 411a, 411b and a set of outer traces 410a, 410b formed thereon. The set of inner traces 411a, 411b respectively first extend along the out trigger 611a, 611b to the weak positions 612a, 612b and second extend along the outer tongue 607 to the PZT connection pads 607a, 607b, the set of outer traces 410a, 410b extend along the float region 455 to the head connection pads 416.

Figure 5A:
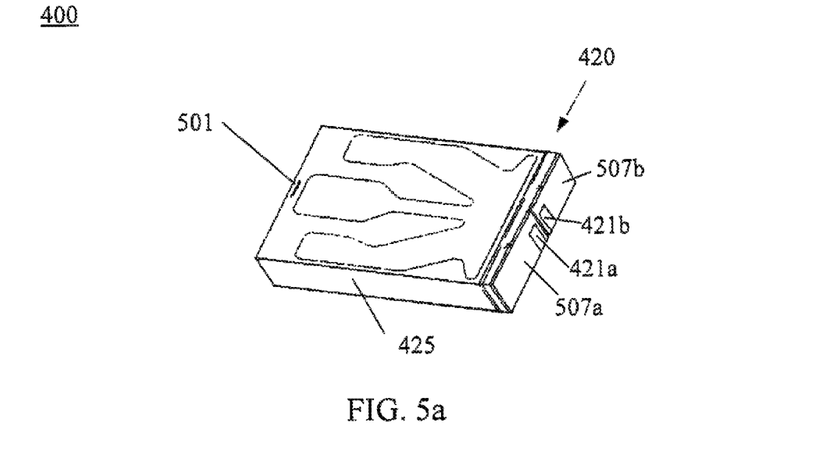
FIG. 5a is a perspective view of the slider and micro-actuator assembly shown in FIG. 3.
Figure 5B:
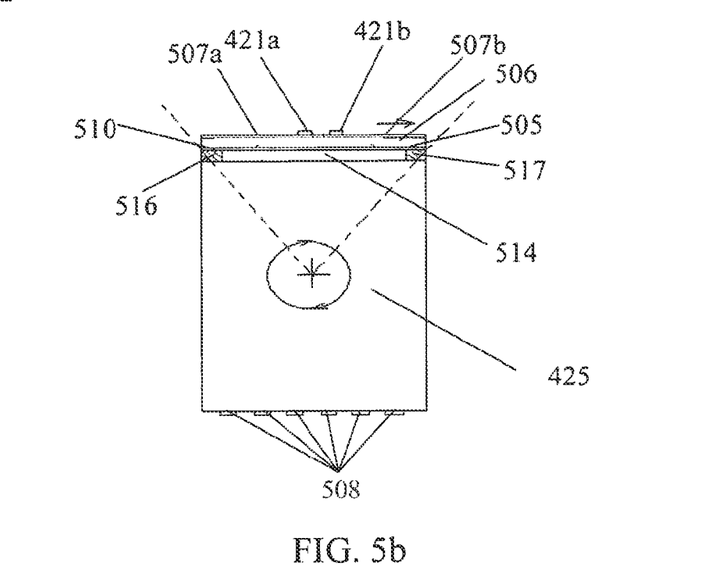

Referring to FIGS. 5a-5b, the slider and micro-actuator assembly 400 comprises a substrate 425 having a trailing edge and a leading edge opposite to the trailing edge, a read/write transducer 501 formed at the trailing edge of the substrate 425 and a piezoelectric micro-actuator 420 formed at the leading edge of the substrate 425. As the piezoelectric micro-actuator 420 is formed at the leading edge of the substrate 425 while the read/write transducer 501 is formed at the trailing edge of the substrate 425, thus when the piezoelectric micro-actuator 420 is driven, no potential voltage will be produced on the read/write transducer 501 and the ESD problem will not happen, which accordingly protects the read/write transducer 501 from damaged.

Preferably, the substrate 425, the read/write transducer 501 and the piezoelectric micro-actuator 420 are integrally formed. In the embodiment, the PZT micro-actuator 420 connects with the leading edge of the substrate 425 via two spaced insulation layers 516, 517 such as adhesive layers or polymer layers, which according forms a space 514 between the leading edge of the substrate 425 and the piezoelectric micro-actuator 420. Such design of the slider and micro-actuator assembly 400 with the space 514 assists to enable that the substrate 425 with the read/write transducer 501 rotates against a center thereof when the piezoelectric micro-actuator 420 is driven to generate a rotation torque to the substrate 425 via the space 514. Specifically, the piezoelectric micro-actuator 420 has a first electrode layer 505 formed at the leading edge of the substrate 425, a piezoelectric layer 506 formed at the first electrode layer 505 and two second electrode layers 507a, 507b respectively formed at the piezoelectric layer 506 and spaced apart from each other thus to form two segments of PZT element. The first electrode layer 505 connects with the leading edge of the substrate 425 by the two spaced insulation layers 516, 517 such as adhesive layers or polymer layers. In the embodiment, the two spaced insulation layers 516, 517 respectively connect one end of each segment of the piezoelectric micro-actuator 420 with the leading edge of the substrate 425. As illustrated above, the first electrode layer 505, the piezoelectric layer 506 and the second electrode layer 507a together form a first segment of piezoelectric element, and the first electrode layer 505, the piezoelectric layer 506 and the second electrode layer 507b together form a second segment of the piezoelectric element. The two segments of the PZT element has a common first electrode layer 505. There are two pads 421a, 421b respectively formed on the two second electrode layers 507a, 507b. In addition, the read/write transducer 501 forms a plurality of pads 508 thereon.

Referring to FIG. 4b, when assembling the slider and micro-actuator assembly 400 to the flexure 403, an insulation layer such as epoxy 602 are employed to mechanically connect the slider and micro-actuator assembly 400 to the inner tongue 608 of the flexure 403. Referring to FIG. 4c, the head connection pads 416 of the float region 455 are respectively and electrically connected with corresponding pads 505 of the read/write transducer 501 via a plurality of solder balls 419, and the two PZT connection pads 607a, 607b of the outer tongue 607 are respectively and electrically connected with corresponding pads 421a, 421b of second electrode layers 507a, 507b of the PZT micro-actuator 420 via solder balls 423, thus, when a voltage is input to the PZT micro-actuator 420 through the inner trace 411a, 411b, one segment of the PZT element will shrink and the other segment will extend which will generate a rotate torque, since the two spaced insulation layers 516, 517 respectively connect one end of each segment of the PZT element of the piezoelectric micro-actuator 420 with the leading edge of the substrate 425, the two soldering balls 423 fix the other end of each segment of the PZT element with the out tongue 607 of the suspension 403, and the out tongue 607 couples the inner tongue 608 which supports the slider and micro-actuator assembly 420 via two curved beams 409, 610, this is why the slider and micro-actuator assembly 420 will rotate again its center, since the transducer 501 is located on the trailing edge of the substrate 425, this is why the position of the transducer 501 is adjusted.

Figure 6A:
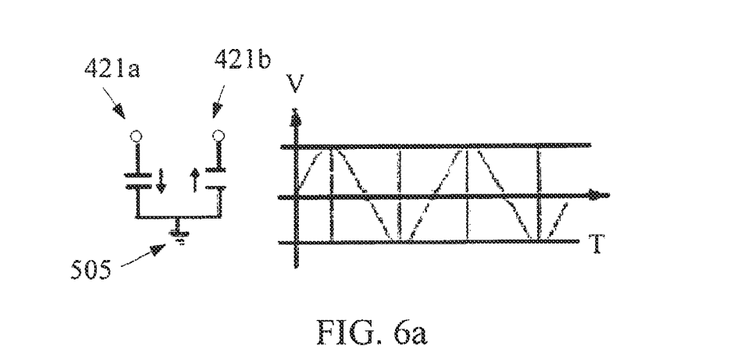
Figure 6B:
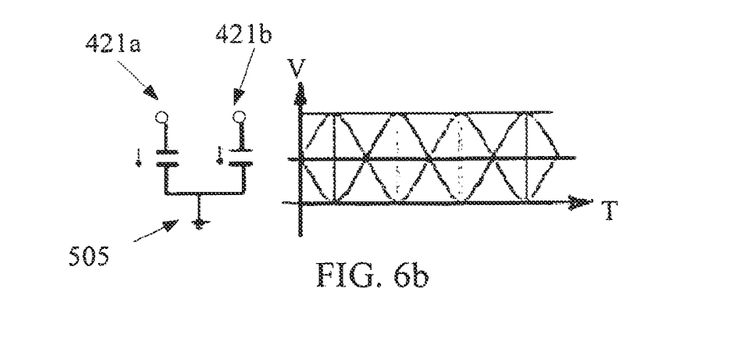

The following will illustrate operational principle of the slider and micro-actuator assembly 400. Referring to FIG. 6a, the first piezoelectric element and the second piezoelectric element posses opposed polarization directions. When the first electrode layer 505 is grounded and the second electrode layers 507a, 507b are applied with the same phase sine voltage via pads 421a, 421b, one of the PZT elements will shrink and the other PZT elements will extend. Referring to FIG. 6b, the first piezoelectric element and the second piezoelectric element posses the same polarization directions. When the first electrode layer 505 is grounded and the second electrode layers 507a, 507b are applied with the opposed phase sine voltage via pads 421a, 421b, one of the PZT elements will shrink and the other PZT elements will extend. Because of the existence of the space 514, the deformation of the first and second piezoelectric element mentioned in above two ways will generate a rotation torque to the substrate 425, which accordingly causes the substrate 425 with the read/write transducer 501 rotates against a center thereof.

Figure 7:
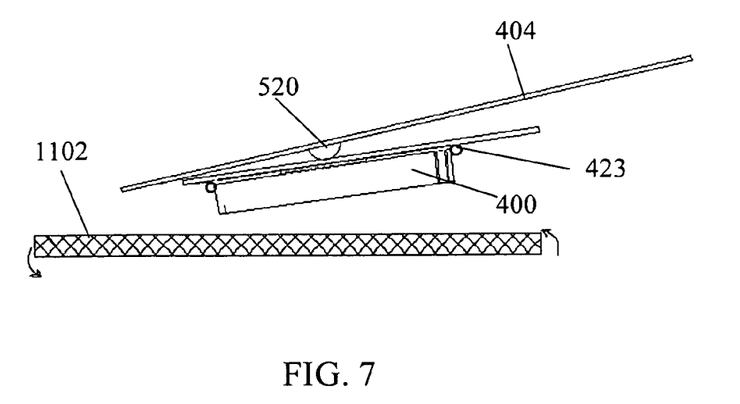
FIG. 7 is a side view of the slider and micro-actuator assembly shown in FIG. 5a with a disk when in operation.

In addition, referring to FIG. 7, as the dimple 520 of the load beam 404 supports the tongue region of the flexure 403 and the tongue region forms a spring structure to support the slider and micro-actuator assembly 400, the slider and micro-actuator assembly 400 is evenly located at the dimple 520 and accordingly purely rotates against the dimple 520. Therefore, the slider and micro-actuator assembly 400 has fine dynamic performance and sound adjustment capability.

Figure 8A:
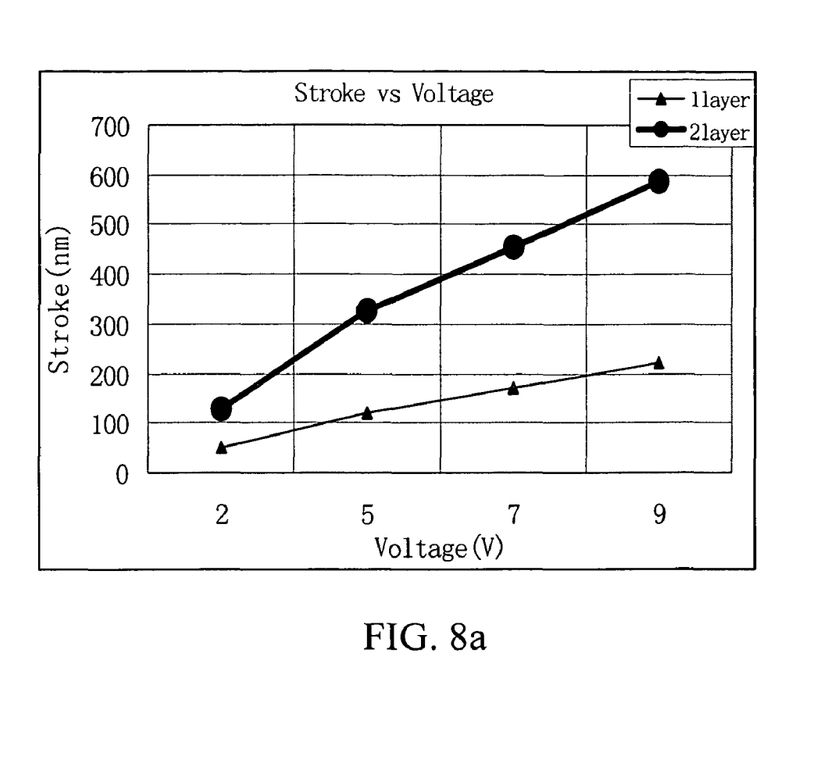
Figure 8B:
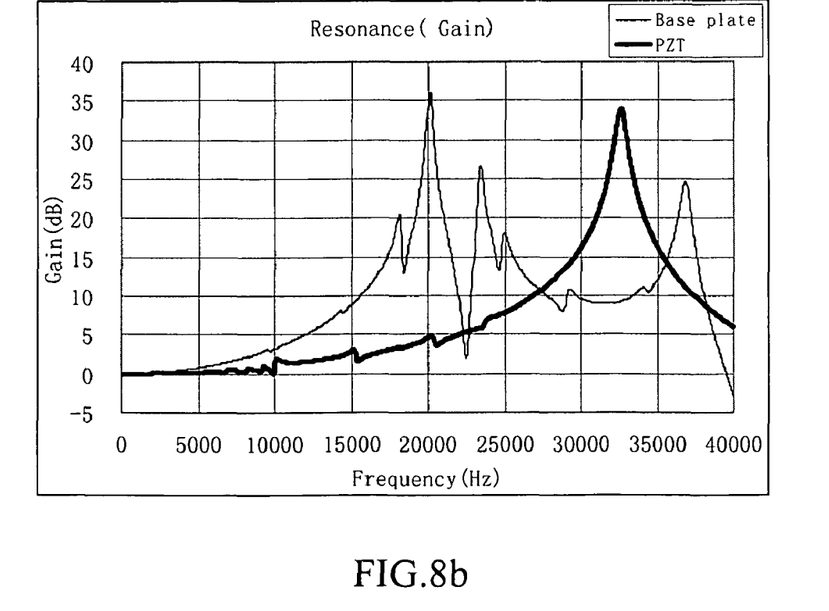
FIG. 8b shows resonance performance of the HGA shown in FIG. 3.

FIG. 8a shows a simulation data of displacement of the slider and micro-actuator assembly 400. The displacement increases significantly seen from the figure, which demonstrates good dynamic performance and adjustment capability. FIG. 8b shows resonance performance of the head gimbal assembly, since the slider and micro-actuator assembly 400 purely rotates against the dimple 520 via the spring structure of the tongue region of the flexure 403, there is no reaction force transfer to suspension when operate the slider and micro-actuator assembly 400, this is why the resonance curve is very clean in lower frequency area, and there is only a resonance peak of the slider and micro-actuator assembly 400, which enables a significant increase in capability of the head position adjustment and a desired servo bandwidth.

Figure 9:
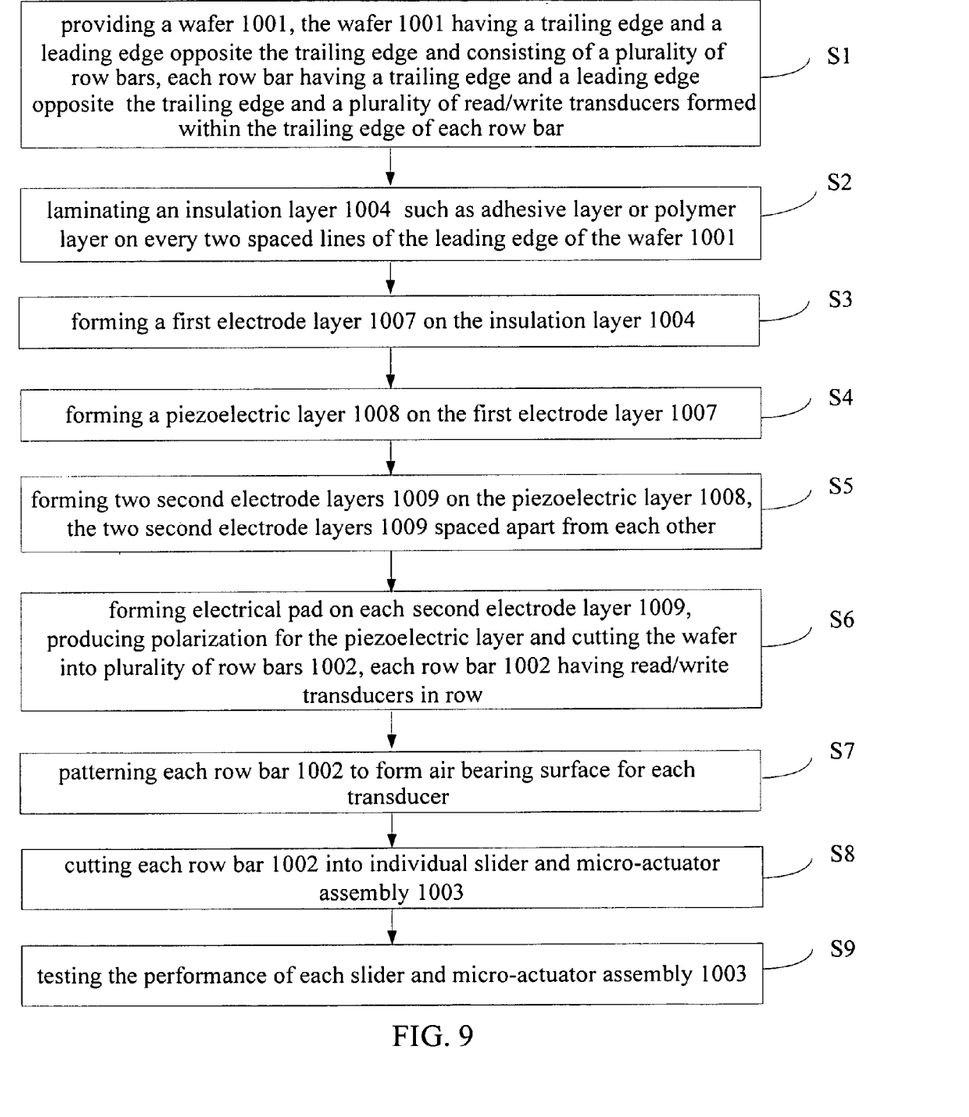
FIG. 9 is a flow chart illustrating a method for manufacturing a slider and micro-actuator assembly according to the present invention.
Figure 10A:
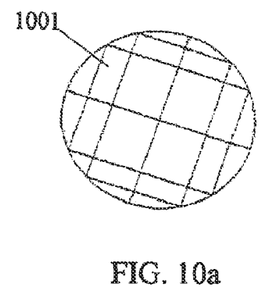
FIG. 10a-10i specifically shows how to manufacture the slider and micro-actuator assembly using the method shown in FIG. 9.
Figure 10B:
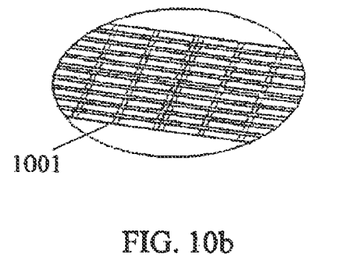
Figure 10C:
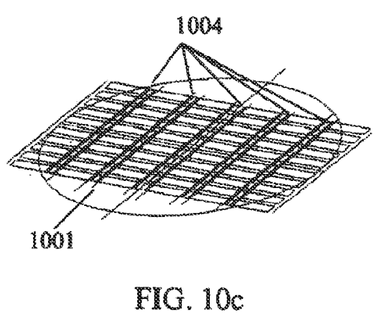
Figure 10D:
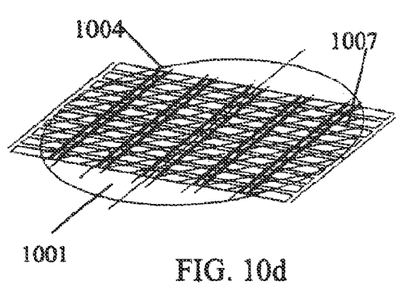
Figure 10E:
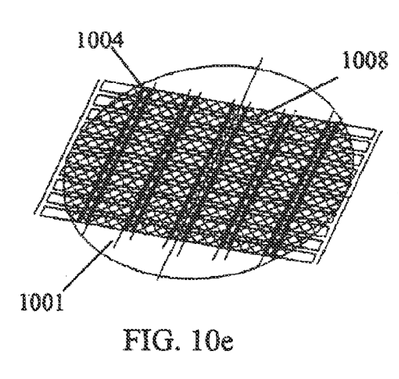
Figure 10F:
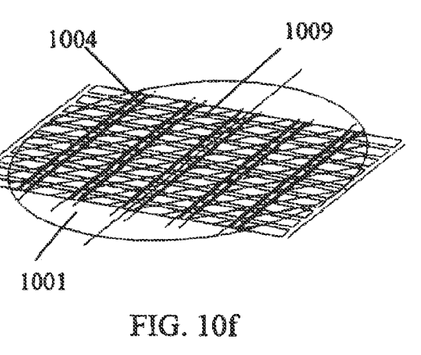
Figure 10G:
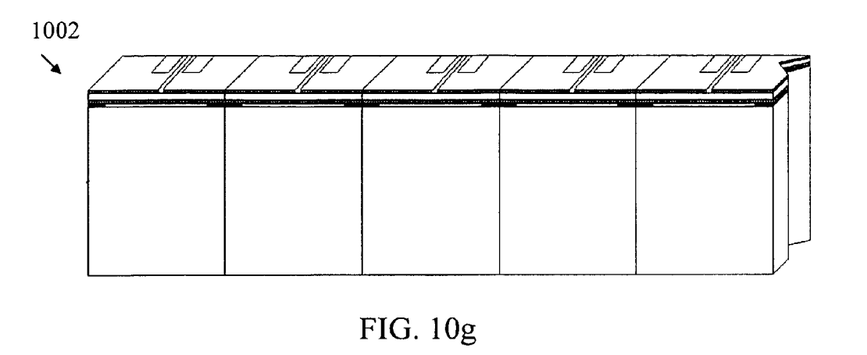
Figure 10H:
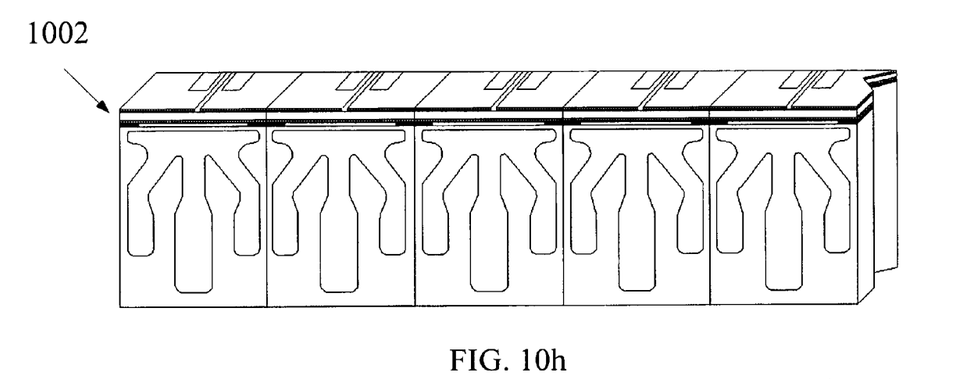
Figure 10I:
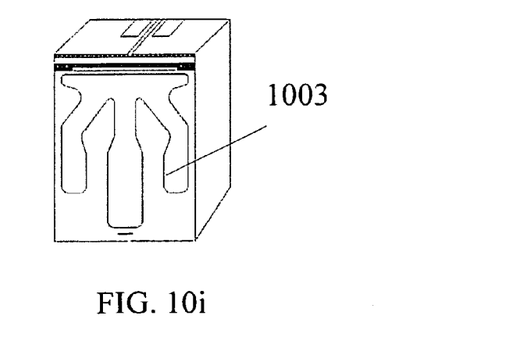

FIG. 9 is a flow chart illustrating a method for manufacturing a slider and micro-actuator assembly according to the present invention and FIG. 10a-10i specifically shows how to manufacture the slider and micro-actuator assembly using the method shown in FIG. 9. Referring to FIG. 9, the method for manufacturing a slider and micro-actuator assembly comprises the steps of: providing a wafer 1001, the wafer 1001 having a trailing-edge and a leading edge opposite the trailing edge and consisting of a plurality of row bars, each row bar having a trailing edge and a leading edge opposite the trailing edge and a plurality of read/write transducers formed within the trailing edge of the each row bar (step S1, also referring to FIG. 10a-10b); laminating an insulation layer 1004 such as adhesive layer or polymer layer, wherein pairs of spaced insulation lines are formed in the leading edge of the wafer 1001 (step S2, referring to FIG. 10c); forming a first electrode layer 1007 on the insulation layer 1004 (step S3, referring to FIG. 10d); forming a piezoelectric layer 1008 on the first electrode layer 1007 (step S4, referring to FIG. 10e); forming two second electrode layers 1009 on the piezoelectric layer 1008, the two second electrode layers 1009 spaced apart from each other (step S5, referring to FIG. 10f); forming electrical pad on each second electrode layer 1009, producing polarization for the piezoelectric layer and cutting the wafer into plurality of row bars 1002, each row bar 1002 having read/write transducer in row (step S6, referring to FIG. 10g); patterning each row bar 1002 to form air bearing surface for each transducers (step S7, referring to FIG. 10h); cutting each row bar 1002 into individual slider and micro-actuator assembly 1003 (step S8, referring to FIG. 10i); testing the performance of each slider and micro-actuator assembly 1003 (step S9)

Figure 11:
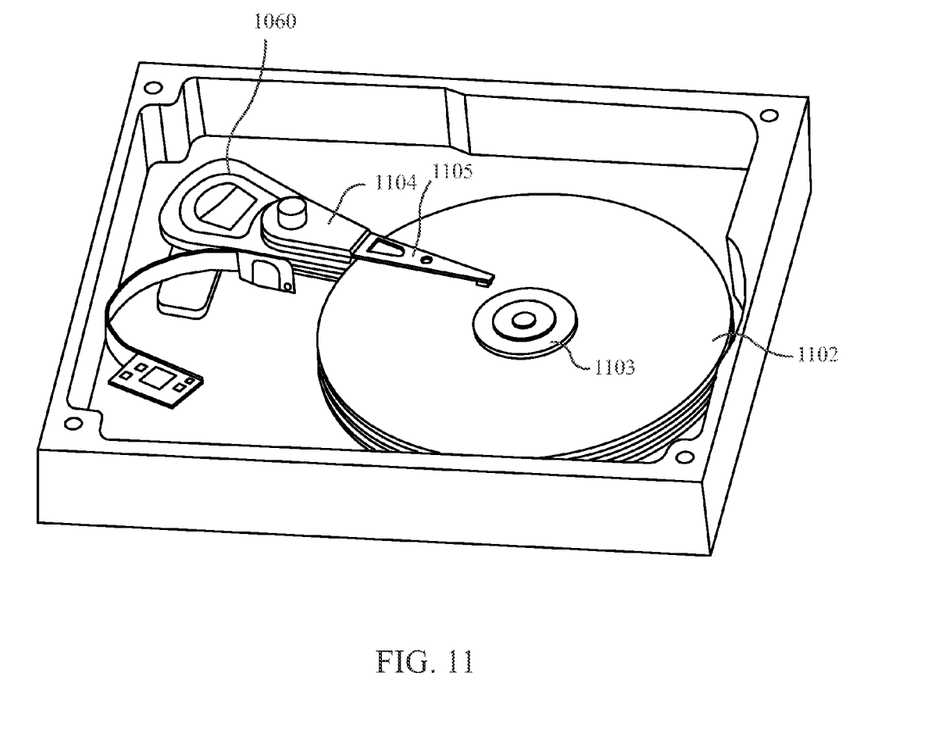
FIG. 11 is a perspective view of a disk drive unit according to the present invention.

FIG. 11 illustrates a disk drive unit according to the present invention. As show in FIG. 11, the disk drive unit can be attained by assembling a cover, a disk 1102, a spindle motor 1103 to spin the disk 1102, a voice coil motor 1060 and a drive arm 1104 connected with the head gimbal assembly 1105. Because the structure and/or assembly process of disk drive unit of the present invention are well known to persons ordinarily skilled in the art, a detailed description of such structure and assembly is omitted herefrom.

The foregoing description of the present invention has been presented for purposes of illustration and description. It is not intended to be exhaustive or limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A slider and micro-actuator assembly, comprising:
   a substrate having a trailing edge and a leading edge opposite the trailing edge;
   a read/write transducer formed at the trailing edge of the substrate; and
   a piezoelectric micro-actuator formed at the leading edge of the substrate,
   wherein the piezoelectric micro-actuator connects with the leading edge of the substrate via two spaced insulation layers so as to form a space between the piezoelectric micro-actuator and the leading edge of the substrate,
   whereby the substrate with the read/write transducer rotates against a center thereof when the piezoelectric micro-actuator is driven to generate a rotation torque to the substrate via the space.

2. The slider and micro-actuator assembly as claimed in claim 1, wherein the substrate, the read/write transducer and the piezoelectric micro-actuator are integrally formed.

3. The slider and micro-actuator assembly as claimed in claim 1, wherein the two spaced insulation layers respectively connect two ends of the piezoelectric micro-actuator with the leading edge of the substrate.

4. The slider and micro-actuator assembly as claimed in claim 1, wherein the piezoelectric micro-actuator comprises a first electrode layer formed at the leading edge of the substrate, a piezoelectric layer formed at the first electrode layer, and two second electrode layers respectively formed at the piezoelectric layer and spaced apart from each other.

5. A head gimbal assembly comprising:
   a slider and micro-actuator assembly; and
   a suspension to support the slider and micro-actuator assembly,
   wherein the slider and micro-actuator assembly comprises:
   a substrate having a trailing edge and a leading edge opposite the trailing edge;
   a read/write transducer formed at the trailing edge of the substrate; and
   a piezoelectric micro-actuator formed at the leading edge of the substrate,
   wherein the piezoelectric micro-actuator connects with the leading edge of the substrate via two spaced insulation layers so as to form a space between the piezoelectric micro-actuator and the leading edge of the substrate, whereby the substrate with the read/write transducer rotates against a center thereof when the piezoelectric micro-actuator is driven to generate a rotation torque to the substrate via the space.

6. The head gimbal assembly as claimed in claim 5, wherein the substrate, the read/write transducer and the piezoelectric micro-actuator are integrally formed.

7. The head gimbal assembly as claimed in claim 5, wherein the two spaced insulation layers respectively connect two ends of the piezoelectric micro-actuator with the leading edge of the substrate.

8. The head gimbal assembly as claimed in claim 5, wherein the piezoelectric micro-actuator comprises a first electrode layer formed at the leading edge of the substrate, a piezoelectric layer formed at the first electrode layer, and two second electrode layers respectively formed at the piezoelectric layer and spaced apart from each other.

9. The head gimbal assembly as claimed in claim 5, wherein the suspension comprises a flexure with a tongue region for supporting the slider and micro-actuator assembly, and the tongue region has an outer tongue, an inner tongue formed within the outer tongue, and a pair of curve beams respectively connected the inner tongue at symmetrical positions with the outer tongue.

10. The head gimbal assembly as claimed in claim 9, wherein the slider and micro-actuator assembly is mechanically mounted on the inner tongue via an insulation layer.

11. The head gimbal assembly as claimed in claim 9, wherein the piezoelectric micro-actuator forms two pads thereon, and the outer tongue forms two piezoelectric connection pads corresponding to the two pads of the piezoelectric micro-actuator, the two pads of the piezoelectric micro-actuator are respectively connected with the two piezoelectric connection pads of the outer tongue.

12. The head gimbal assembly as claimed in claim 9, wherein the flexure comprises a pair of outer triggers at opposite sides of the outer tongue, the pair of outer triggers respectively extend toward and connect with the outer tongue.

13. A disk drive unit comprising:
a head gimbal assembly;
a drive arm to connect with the head gimbal assembly;
a disk;
a spindle motor to spin the disk,
wherein the head gimbal assembly comprises:
a slider and micro-actuator assembly; and
a suspension to support the slider and micro-actuator assembly,
wherein the slider and micro-actuator assembly comprises:
a substrate having a trailing edge and a leading edge opposite the trailing edge;
a read/write transducer formed at the trailing edge of the substrate; and
a piezoelectric micro-actuator formed at the leading edge of the substrate,
wherein the piezoelectric micro-actuator connects with the leading edge of the substrate via two spaced insulation layers so as to form a space between the piezoelectric micro-actuator and the leading edge of the substrate,
whereby the substrate with the read/write transducer rotates against a center thereof when the piezoelectric micro-actuator is driven to generate a rotation torque to the substrate via the space.

14. A method for manufacturing a slider and micro-actuator assembly comprising steps of:
providing a wafer, the wafer having a trailing edge and a leading edge opposite the trailing edge and a plurality of read/write transducers formed within the trailing edge of the wafer;
laminating an insulation layer, wherein pairs of spaced insulation lines are formed in the leading edge of the wafer;
forming a piezoelectric micro-actuator on the insulation layer;
cutting the wafer into plurality of row bars, each row bar having read/write transducers in row;
patterning each row bars to form air bearing surface for each transducer; and
cutting each row bar into individual slider and micro-actuator assembly.

15. The method for manufacturing a slider and micro-actuator assembly as claimed in claim 14, wherein the step of forming a piezoelectric micro-actuator on the insulation layer further comprises:
forming a first electrode layer on the insulation layer;
forming a piezoelectric layer on the first electrode layer; and
forming two second electrode layers on the PZT layer surface, the two second electrode layers spaced apart from each other.

* * * * *